Patented Mar. 22, 1949

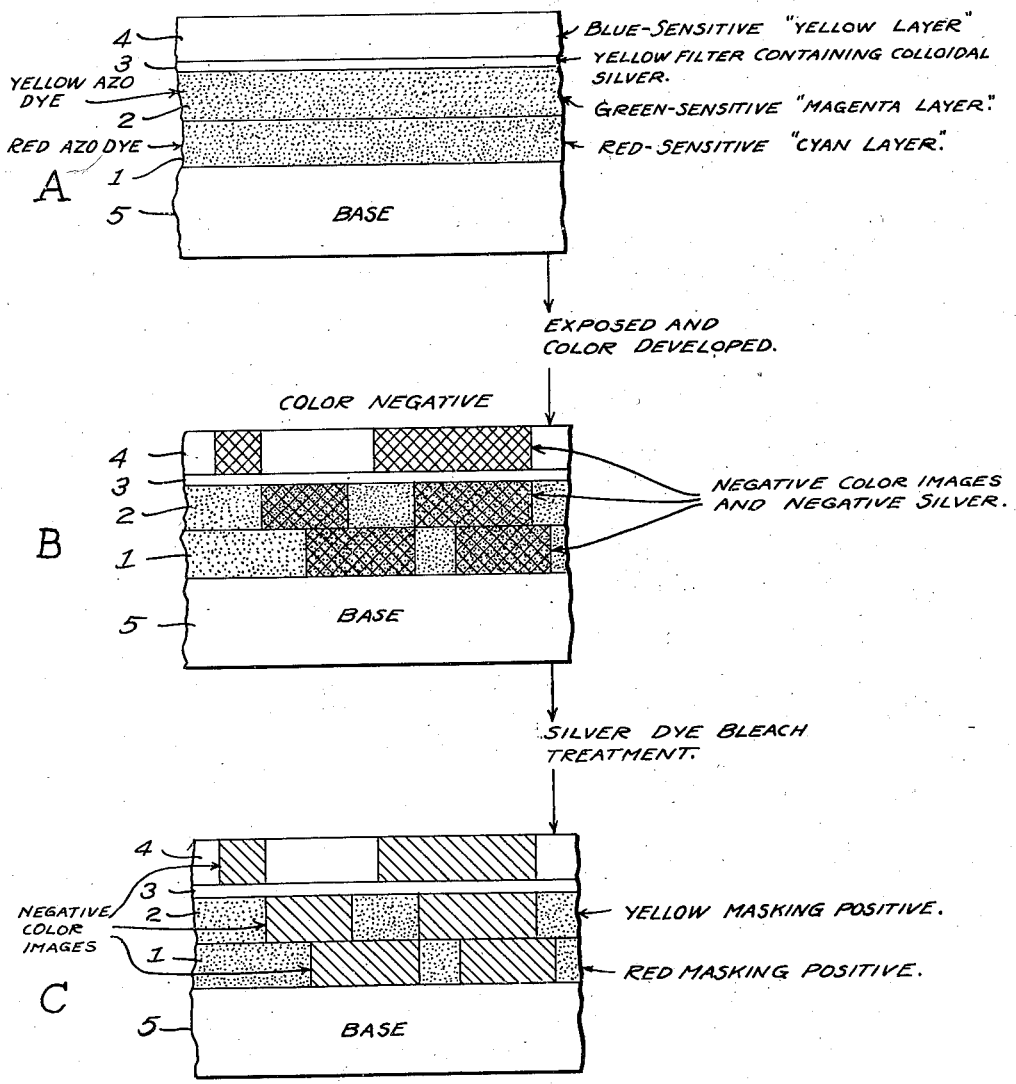

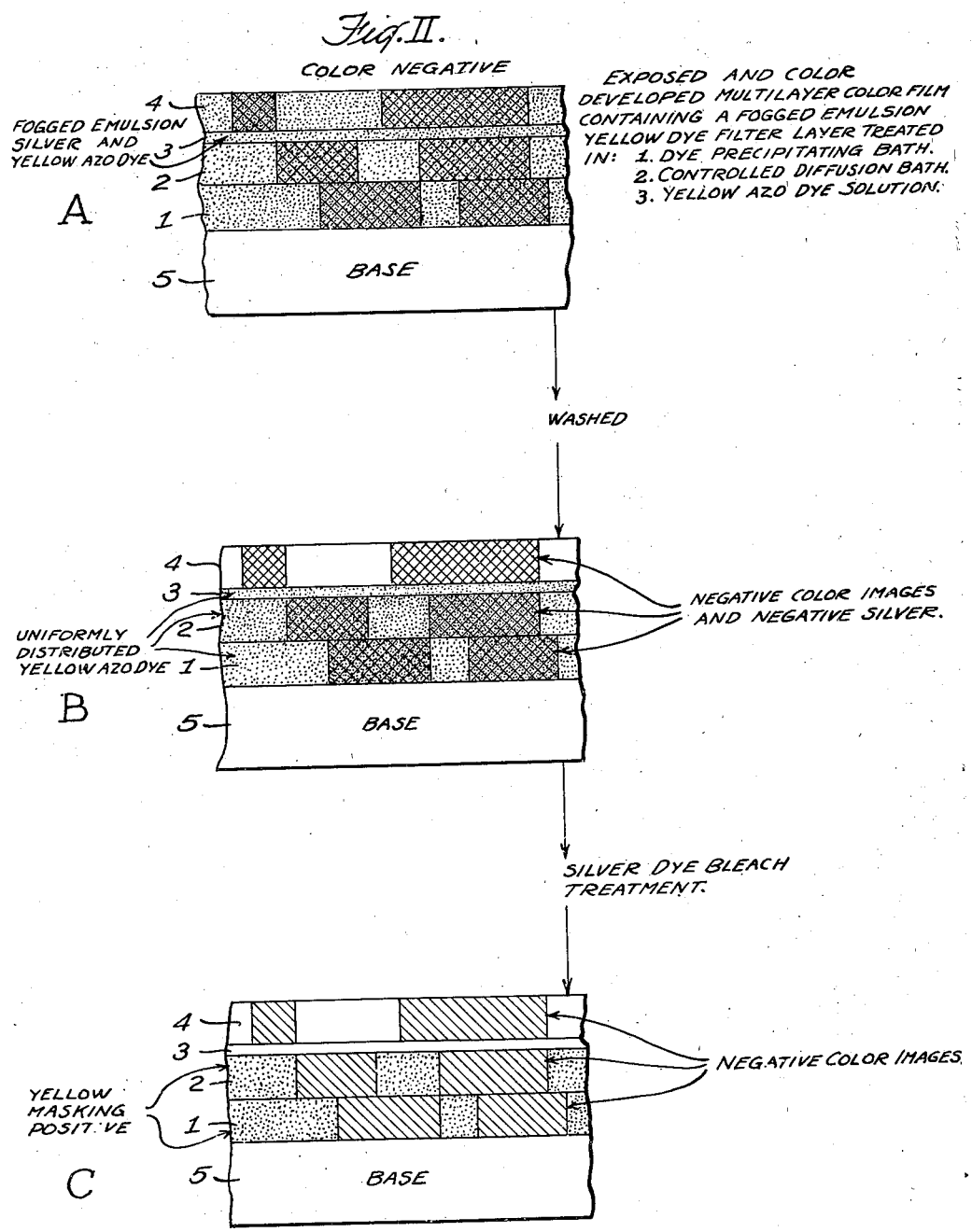

2,464,798

UNITED STATES PATENT OFFICE 2,464,798

COLOR CORRECTION OF MULTICOLOR NEGATIVE FILM BY INTEGRAL MASKING IMAGES

Herman H. Duerr, Herbert W. Morreall, Jr., and Harold C. Harsh, Binghamton, N. Y., assignors to General Aniline & Film Corporation, New York, N. Y., a corporation of Delaware Application May 3, 1944, Serial No. 533,833

5 Claims. (Cl. 95—2)

The present invention relates to color photography and particularly to color negatives containing integral masking images for color correction purposes, and to processes of producing said color negatives.

In the production of color prints or color transparencies from natural order color negatives, the multilayer color negative consists of yellow, magenta and cyan images in three different layers; the cyan image represents the red, the magenta image the green and the yellow image the blue record of the original subject. Color positive prints or transparencies may be obtained from such color negatives by direct printing on a multilayer color positive film or paper or by making color separation negatives which are then used for the making of color positive prints.

It is known that the colors, pigments or inks which are used in color photography for forming the transparent dye images are not ideal in their absorption characteristics for allowing color reproductions which are perfectly true in their color hues. Various ways and means have been devised to correct for the imperfect absorption of the dyes which are used. Generally it has not been very difficult to find suitable yellow dyes or pigments which have acceptable absorption characteristics and therefore images of such dyes need no correction in color printing processes. The magenta dyes, however, especially those which are obtained by color-forming development, and the cyan dyes do not have these desirable absorption characteristics. The magenta dyes, pigments or inks usually have very undesirable absorption in the blue and in many cases incomplete absorption in the green region. The cyan dyes usually show a considerable absorption in the blue and green region. To compensate for these deficiencies in the absorption of the magenta and cyan dyes in color negatives, it is necessary to apply color correction or "masking methods" in order to obtain color prints with true tonal values.

One well known method of obtaining such color correction consists in making a weak positive from one color record and superimposing this positive mask with a second color record when printing from the latter record. In this case an additional film and printing operation are necessary to provide the color correction mask. Furthermore, the problem of securing the proper registration of the two images makes this method complicated. It has also been proposed to incorporate in a multilayer film containing color forming components a separate emulsion layer and to convert this separate layer by special and complicated processing steps into a masking layer.

In U. S. Patent 2,357,388, issued September 5, 1944, we have described a process wherein the difficulties and disadvantages attendant upon the use of known processes and known color negatives containing color images can be overcome by producing only in the cyan and magenta layers of negative substractively colored multilayer film so called positive "rest images" or stained images and utilizing these images as masks in printing to compensate for the incorrect color absorption of the cyan and magenta dyes. We have now found that another method for integral masking can be used for multilayer color negative films with or without color coupling components in the individual emulsion layers which also has definite advantages over the known methods of color correction. The masks according to this method are produced within the individual layers of the color negative material itself, thereby obviating any difficulties of registration. This new method of color correction is simple and self-controlling in operation.

The invention will be more readily understood when read in connection with the accompanying drawing, in which:

Figure I comprises sectional views of a multilayer color film treated in accordance with this masking process. Views A, B and C of Figure I illustrate the original condition of the film and the changes due to exposure, color development and silver dye bleach treatment as follows:

A illustrates a section of the original multilayer color material containing a yellow azo dye and a red azo dye in the magenta and cyan layers respectively.

B illustrates the multilayer color film of view A after exposure to a colored subject and after color development in a color developer.

C illustrates the condition of the same multilayer film after it has been treated in a dye-silver bleaching bath.

Figure II comprises sectional views of a multilayer color film which has been exposed and color developed and thereafter saturated with a yellow azo dye, washed and treated in a silver-dye bleach bath, as follows:

View A illustrates the condition of the multilayer color film after exposure and color development and treatment with a solution of a yellow azo dye.

View B illustrates the condition of the same multilayer color film after a controlled washing of the yellow azo dye from the top layer.

View C illustrates the condition of the same multilayer color film after it has been treated in a silver-dye bleach bath.

Referring to the drawings and particularly to Figure I-A thereof, it will be seen that the original material comprises a base 5 upon which are superimposed three silver halide emulsion layers, one of which, indicated by the numeral 1, is red sensitive; another of which, indicated by the numeral 2, is green sensitive; and a third of which, indicated by the numeral 4, is blue sensitive. On top of the green sensitive or so-called "magenta layer" there is a gelatine filter layer 3 containing colloidal silver or a fogged emulsion containing a yellow azo dye which can be destroyed in the presence of silver in a dye-silver bleaching bath. Suitable yellow azo dyestuffs for this purpose would be, for instance, Fastusol Yellow LRA (Benzo Fast Yellow RL, Color Index 1st edition, 1924, #349A). Suitable colloidal silver filter layers are disclosed in U. S. P. 2,220,187.

The red sensitive layer, layer 1, may contain a non-diffusing color coupling component capable of being developed to a cyan dye image with a color developer comprising an aromatic amino developing agent such as diethyl-para-phenylamine-diamine. We have found that suitable cyan dye images may be produced from the color components disclosed in U. S. P. 2,179,238, 2,186,733 and 2,224,329. Specific examples of such color components are, for instance, 3.5-di(phenylamino)phenol, abietyl-amino-naphthol, 1-N-stearyl-4-N-(1-hydroxy-2'-napthoyl)-phenylenediamine sodium sulfonate and the like. The green sensitive layer 2 may contain a color coupling component capable of forming a magenta dye with a suitable color developer as above. Satisfactory color components for the magenta image are the non-diffusing components described in U. S. Patents 2,178,612 and 2,179,238. Examples of such components are the condensation product of meta-amino-phenyl-methyl-pyrazolone and the mixed polymer of vinyl chloride and maleic acid anhydride, 1[myristyl amino 2-sulfo]phenyl-3-methyl-5-pyrazolone, and the like. The blue sensitive layer 4 contains a color coupling component capable of forming a yellow dye image with a color developer as above. Satisfactory components for this layer are the non-diffusing yellow color components described in U. S. Patents 2,179,238 and 2,224,329, examples of which are terephthaloyl-bisacetic acid anilide-p'-carboxylic acid, and the like.

The multilayer film of Figure I having the cyan magenta and yellow color components in the respective layers 1, 2 and 4, is treated so as to produce a yellow or red azo dye masking image in the cyan layer and a yellow azo dye masking image in the magenta layer. This is accomplished by either incorporating yellow or red azo dyes of low color density in the cyan layer and a yellow azo dye of low color density in the magenta layer when the film is being made or by submitting the multilayer film of Figure I-A to a treatment with a yellow azo dye solution in such a way as to incorporate yellow azo dye in the cyan and magenta layers only after the film has been exposed and color developed. The yellow and red azo dyes which are so used in the magenta and cyan layers preferably should be substantive to genatine or contain groups so that they can be precipitated with precipitating agents such as calcium lactate and diphenyl-guanidine or B-naphthyl-bi-guanide so as to make them non-diffusing. These azo dyes must also be capable of being destroyed by a suitable bleach bath in the presence of silver, for instance, thiourea in acid solution. Azo dyes suitable for this purpose are, for instance, Walk Yellow O (sodium salt of sulfo-β-naphthalene azo salicylic acid), Xylen Walk Yellow (sodium salt of sulfanilic acid azo 1-o, m-dichlor-p-sulfophenyl-3-methyl-5-pyrazolone), Fastusol Yellow L. R. A. (Color Index, 1st edition, 1924, #349A), Extra, Brilliant Purpurine (Schultz 423, 1931, 7th edition), Congo Red (Schultz 360, 7th edition, vol. I, 1931), Cotton Red 4B (Schultz 448, 7th edition, vol. I, 1931), and Direct Red (Schultz 439, 7th edition, vol. I, 1931).

A preferred method of processing the film in order to obtain a suitable integral masking image in the multicolor negative described above wherein the azo dyes are incorporated in the cyan and magenta layers is as follows:

After exposure to a colored subject of a multilayer color negative film containing the color coupling components in the cyan, magenta and yellow layers 1, 2 and 4 respectively, the film is color developed in a color developer, for instance, a diethyl-para-phenylene-diamine developer such as one of the following composition:

| | |
|---|---|
| Sodium sulfite _____ gram __ | 1 |
| Diethyl-para-phenylene-diamine __ grams __ | 2 |
| Sodium carbonate _____ do __ | 50 |
| Potassium bromide _____ do __ | 2 |
| Water—to make _____ cc __ | 1000 |

This color development produces a negative color image illustrated in Figure I-B. Referring to said Figure I-B, the top layer 4 contains at this step a yellow colored negative image together with a negative silver image, the filter layer 3 has not been affected in the case where a layer of colloidal silver dispersed in gelatin has been used. If a fogged emulsion containing a yellow azo dye has been used for the filter, this layer would contain a uniform silver deposit together with a uniformly distributed yellow azo dye. The magenta layer 2 contains the uniformly distributed yellow azo dye in low concentration plus a magenta colored negative image in situ with a negative silver image. The cyan layer 1 contains a uniformly distributed red azo dye in low concentration plus a cyan colored negative image in situ with a negative silver image. The film is now fixed and washed by the usual methods. It is then treated in a silver dye bleach bath which has no irreversible effect upon azo methine or quinone imine dyes produced by color development. Acid thiourea and potassium thiocyanate baths, of which the following are typical examples, have been found suitable for this purpose:

| | I | II | III |
|---|---|---|---|
| Thiourea _____ grams __ | 20 | 50 | ----- |
| KCNS _____ do __ | ----- | ----- | 50 |
| HCl (conc.) _____ cubic centimeters __ | 10 | ----- | 60 |
| Citric Acid _____ grams __ | ----- | 25 | ----- |
| Water—to make ____ cubic centimeters __ | 1,000 | 1,000 | 1,000 |

Similar silver dye bleach baths may be substituted which contain, in place of the thiourea or potassium thiocyanate, any nitrogen compound containing a thioketo group which is water soluble or can be water solubilized. Further examples of such compounds are: rhodanine, thiohydantoin, thiourazole, and thiotetrazoline. Any water soluble inorganic thiocyanate and thiourea-dioxide may also be used.

The yellow azo dyestuff in the magenta layer 2 and the red azo dyestuff in the cyan layer 1, are destroyed in situ with the negative silver in said magenta and cyan layers by the silver dye bleach bath. The negative color images which have been produced by color-forming development are little if any affected by the acid thiourea bath. In case the color densities of these color images, however, have been decreased by the acid, the color can be brought back by a short rinse in a diluted sodium carbonate solution.

The azo dyes in the cyan and magenta layers are bleached out proportionally in all places where negative silver has been developed in the original color development and masking positive dye images of low density are formed in these two layers. Figure III illustrates the condition of the layers at this stage of the procedure. The dotted areas in layers 1 and 2 represent the yellow and red positive masking images in the magneta and cyan layers respectively. The contrast of these masking images is controlled by the bleaching time in the acid thiourea silver-dye bleach bath and by the original azo dye concentration in the layers. The residue of negative silver contained in the layers can be bleached out in a regular ferricyanide bleach bath such as one of the following composition:

Potassium ferricyanide _____grams__ 10
Water—to make _____cc__ 1000

Finally the film is fixed in a standard fixing bath of for instance 10% hypo.

Instead of incorporating the yellow azo dyes in the cyan and magenta layers at the time these layers are coated as above, it is also possible to use a regular negative color film containing color components and to produce a dye masking image in the cyan and magenta layers after the film has been exposed and color developed by immersing the film in a suitable yellow azo dye solution. This procedure is illustrated in Figure II. Referring to Figure II-A, a multilayer color film containing color components in the various layers has been exposed and color developed to a color negative. The silver halide has been fixed out but the negative silver remains in the layers. The filter layer 3 also contains developed silver derived from the use of a fogged emulsion together with a yellow azo dye which can be destroyed in a silver dye bleach bath. This film is preferably prepared for fixation of the yellow azo dye by treating it after the color development with a dye precipitating solution of the type mentioned above. We prefer to use as a dye precipitating agent diphenylguanidine acetate or B-Naphthyl-bi-guanide hydrochloride. After treatment with the dye precipitating solution the film is dried and then washed in water containing a higher alcohol as, for instance, isopropyl alcohol which controls the diffusion of the wash water and confines it to the top layer 4. This controlled washing will leave the precipitating agent only in the cyan and magenta layers, 1 and 2 respectively. Although preferable, it is to be understood that this step of removing the dye precipitant from all but the cyan and magenta layers is not critical. The film is next immersed in a solution of a yellow azo dye. Because of the presence of the dye precipitating agent, the dyestuff of this solution is precipitated in the cyan and magenta layers. The yellow azo dye is washed out of the yellow layer 4. The condition of the film at this point is illustrated by Figure II-B. The top layer 4 contains a yellow colored negative image together with the negative silver image. The filter layer 3 contains a uniform silver deposit together with a uniformly distributed yellow azo dye. The magenta layer 2 contains the uniformly distributed yellow azo dye plus a magenta colored negative image in situ with a negative silver image. The cyan layer 1 contains a uniformly distributed yellow azo dye plus a cyan colored negative image in situ with a negative silver image. The uniformly distributed yellow dye in these latter layers can now be used for the formation of a yellow masking image in the same way as described above in connection with the procedure wherein the yellow dye was incorporated in the film prior to exposure and development. Accordingly, the silver of the color negative image is utilized to destroy the yellow azo dye in situ by treating the film in a silver dye bleach bath such as an acid thiourea dye bleaching bath of the composition given above. The negative color images are not affected and a positive yellow masking image remains in the cyan and magenta layers. The residual negative silver can be bleached out in a regular ferricyanide bleach bath such as the one referred to above and fixed in the usual manner. The final condition of the film is illustrated in Figure II-C wherein the dotted areas in layers 1 and 2 represent the yellow positive masking images in the cyan and magenta layers respectively. Contrast or density of these masking images is controlled by the bleaching time in the silver dye bleach bath and by the concentration of the yellow azo dye in the layers.

The following examples will serve to further illustrate our invention, it being understood that the invention is not limited thereto. Except as otherwise noted, the parts are by weight.

*Example I*

To 1000 cc. of a panchromatic-sensitized silver-halide emulsion, 10 grams of the cyan color former 1-N-stearyl 4 - N - (1-hydroxy-2'-naphthoyl) phenylenediamine sulfonic acid sodium salt are added. (U. S. P. 2,224,329). In addition to the color former, 0.5 gram of Brilliant Purpurine 10B (Schultz #423 7th edition, vol. I, 1931) is added to the emulsion. The emulsion is coated on a support producing a dry emulsion thickness of approximately 6 to 8 m$\mu$. A green-sensitive emulsion layer containing the condensation product of meta-amino-phenyl-methyl-pyrazolone and the mixed polymer of vinyl chloride and maleic acid anhydride as a non-diffusing magenta color component is coated on top of the cyan layer, followed by a yellow filter layer and a blue-sensitive emulsion layer containing terephthaloyl-bis-acetic acid anilide-p'-carboxylic acid as a non-diffusing color component for yellow. After exposure and color development for approximately 10 minutes at 70° F. in the following color developer:

Diethyl paraphenylenediamine hydrochloride _____grams____ 3
Sodium carbonate, monohydrate____do____ 50
Potassium bromide _____do____ 2
Water to make _____cc__ 1000 the film is fixed in a fixing bath of the following concentration:

Sodium thiosulfate _____grams__ 100
Water to make _____cc__ 1000

The film now contains a cyan image in the panchromatic bottom layer in situ with the negative silver image. In addition to this cyan image, this layer is uniformly colored red by the Brilliant Purpurine, the red dye density being approximately 0.6. The positive red masking image in this layer is now formed by bleaching the red azo dye in situ with the negative silver image by treating the film in an acid thiourea bath in the concentration No. I of the table in column 4. The red azo dye will be bleached out in proportion to the density of the negative silver and a low density positive red masking image is formed in the layer.

Other dyes such as Congo Red (Schultz 360, 7th edition, vol. I, 1931) or Cotton Red 4B (Schultz 448 7th edition, vol. I, 1931) or Fastusol Yellow L. R. A. (Benzo Fast Yellow R. L., Color Index, 1st edition, 1924, #349A) may be substituted for the brilliant purpurine 10B in concentration of 0.4 gram per 1000 cc. of emulsion.

*Example II*

To 1000 cc. of a panchromatic sensitized silver halide emulsion, 10 grams of the cyan color former 1-N-stearyl 4-N-(1-hydroxy-2'-naphthoyl)-phenylene-diamine sulfonic acid sodium salt are added. The emulsion is coated on a support producing a dry emulsion thickness of approximately 6 to 8 m$\mu$. A green-sensitive emulsion layer containing 1[myristyl amino 2-sulfo]phenyl-3-methyl-5-pyrazolone as a non-diffusing magenta color component is coated on top of the cyan layer. In addition to the non-diffusing magenta color component, this layer contains 0.6 gram of Milling Yellow (Schultz 230). A yellow filter layer and a blue sensitive emulsion layer containing terephthaloyl-bisacetic acid anilide-p'-carboxylic acid as a non-diffusing color component for yellow are then coated on top of the green-sensitive emulsion layer. After exposure and color development for approximately 10 minutes at 70° F. in the following color developer:

Diethyl paraphenylenediamine hydrochloride _____grams__ 3
Sodium carbonate, monohydrate____do____ 50
Potassium bromide _____do____ 2
Water to make _____cc___ 1000 the film is fixed in a fixing bath of the following concentration:

Sodium thiosulfate _____grams__ 100
Water to make _____cc___ 1000

The film now contains a magenta image in the green-sensitive layer in situ with the negative silver image. In addition to this magenta image, this layer is uniformly colored yellow by the Milling Yellow. The positive yellow masking image in this layer is now formed by bleaching the yellow azo dye in situ with the negative silver image by treating the film in an acid thiourea bath in the concentration No. I of the table in column 4. The yellow azo dye will be bleached out in proportion to the density of the negative silver and a low density yellow masking image is formed in the layer.

*Example III*

To 1000 cc. of a panchromatic-sensitized silver halide emulsion, 10 grams of the cyan color former 1-N-stearyl-4-N-(1-hydroxy-2'-naphthoyl) phenylenediamine sulfonic acid sodium salt are added. In addition to the color former 0.4 gram of Congo Red is added to the emulsion. The emulsion is coated on a support producing a dry emulsion thickness of approximately 6 to 8 m$\mu$. A green-sensitive emulsion layer containing 1[myristyl amino 2-sulfo]-phenyl-3-methyl-5-pyrazolone as a non-diffusing magenta color component is coated on top of a cyan layer. This layer, in addition to the non-diffusing magenta color component, contains 0.6 gram of Fastusol Yellow L. R. A. (Color Index, 1st edition, 1924, #349A). A yellow filter layer and blue sensitive emulsion layer containing terephthaloyl-bisacetic acid anilide-p'-carboxylic acid as a non-diffusing color component for yellow are then coated on the green-sensitive emulsion layer. After exposure and color development for approximately 10 minutes at 70° F. in the following color developer:

Diethyl paraphenylenediamine hydrochloride _____grams__ 3
Sodium carbonate, monohydrate ____do____ 50
Potassium bromide_____do____ 2
Water to make _____cc___ 1000 the film is fixed in a fixing bath of the following concentration:

Sodium thiosulfate _____grams__ 100
Water to make _____cc___ 1000

The film now contains a cyan image in the panchromatic bottom layer in situ with the negative silver image and a magenta image in the green-sensitive emulsion layer also in situ with the negative silver image. In addition to the cyan and magenta images these layers are uniformly colored red and yellow respectively by the Congo Red (Schultz 360, 7th edition, vol. I, 1931) and Fastusol Yellow (Color Index, 1st edition, 1924, #349A) dyes added thereto. The positive red masking image in the cyan layer and the positive yellow masking image in the magenta layer are now formed by bleaching the respective red and yellow azo dyes in situ with the negative silver image by treating the film in an acid thiourea bath in the concentration No. I of the table in column 4. The red azo dye in the cyan layer and the yellow azo dye in the magenta layer will be bleached out in proportion to the density of the negative silver and a low density positive red masking image is formed in the cyan layer and a low density positive yellow masking image in the magenta layer.

Various modifications of this invention will occur to persons skilled in the art and it is, therefore, understood that we do not intend to be limited in the patent granted except as required by the claims.

We claim:

1. In the production of subtractively colored negatives with correction printing masks from multilayer film having differently sensitized silver halide emulsions, one layer being capable of producing a cyan negative image and another a magenta negative image by exposing said multilayer film to a colored object and color developing the same, the improvement which comprises treating such a multilayer film which has been exposed, color developed and fixed, with a bath containing a yellow azo dye, capable of forming a yellow positive dye image upon treatment with a silver dye bleach bath, washing the said yellow dye out of the color layers other than the cyan and magenta layers by a controlled diffusion washing, precipitating said dye in the layer with a dye precipitating agent and then treating the film with a silver dye bleach bath which does not irreversibly affect the dyes produced by the color development.

2. In the production of subtractively colored negatives with correction printing masks from multilayer film having differently sensitized silver halide emulsions, one layer being capable of producing a cyan negative image and another a magenta negative image by exposing said multilayer film to a colored object and color developing the same, the improvement which comprises treating such a multilayer film which has been exposed, color developed and fixed, with a dye precipitating solution, washing the dye precipitating substance out of the color layers other than the cyan and magenta layers by a controlled diffusion washing, immersing the so treated film in a solution of a yellow azo dye capable of forming a positive dye image upon treatment with a silver dye bleach bath, washing the yellow azo dye out of those layers not containing the dye precipitant, and then treating the film with a silver dye bleach bath which does not irreversibly affect the dyes produced by the color development.

3. The process of producing in a multi-layer negative film, subtractively colored negatives with positive correction printing masks by a single exposure and development, said multi-layer film having superimposed gelatino silver halide emulsions the innermost of which is sensitized for red and contains a color former for producing a cyan negative image, the intermediate layer of which is sensitized for green and contains a color former capable of producing a magenta negative image, and the outermost layer of which is sensitized for blue and contains a color former capable of producing a yellow negative image, the steps of exposing said film to a colored object, developing said film in a primary aromatic amino color developer to produce the subtractively colored negatives in the aforesaid layers in situ with silver images and at a stage prior to bleaching the silver images, uniformly dyeing at least one of said gelatino silver halide emulsion layers, other than said outermost layer with an azo dye of low color density selected from the group consisting of azo dyes substantive to gelatin and azo dyes rendered non-diffusing by the incorporation of a precipitating agent in the layer to be dyed by said azo dye, in the case of the cyan containing layer said azo dye being of the class consisting of yellow and red azo dyes and in the case of the magenta containing layer a yellow azo dye, fixing the unexposed silver halide and subjecting the film to the action of a silver azo dye bleaching bath, which does not irreversibly affect the dyes of the negative color images, to destroy the azo dyes at the points of the silver image, and yield a positive azo dye image in at least one of the layers bearing the cyan and magenta negative images.

4. The process of claim 3 wherein the azo dyes of low color density are incorporated into at least one of the green and red sensitive layers during the preparation of said layers.

5. The process of claim 3 wherein the azo dyes of low color density are incorporated into at least one of the cyan and magenta layers after the film has been exposed and color developed and contains the cyan and magenta negative images.

HERMAN H. DUERR.
HERBERT W. MORREALL, JR.
HAROLD C. HARSH.

REFERENCES CITED

The following references are of record in the file of this patent:

UNITED STATES PATENTS

| Number | Name | Date |
|---|---|---|
| 1,229,546 | Thornton | June 12, 1917 |
| 1,308,538 | Brewster | July 1, 1919 |
| 2,137,336 | Gaspar | Nov. 22, 1938 |
| 2,183,394 | Gaspar | Dec. 12, 1939 |
| 2,193,931 | Michaelis | Mar. 19, 1940 |
| 2,203,656 | MacAdam et al. | June 4, 1940 |
| 2,221,025 | MacAdam et al. | Nov. 12, 1940 |
| 2,307,162 | Schultze | Jan. 5, 1943 |
| 2,340,656 | Gaspar | Feb. 1, 1944 |

FOREIGN PATENTS

| Number | Country | Date |
|---|---|---|
| 375,338 | Great Britain | June 24, 1932 |